US011931305B2

(12) United States Patent
Comstock

(10) Patent No.: US 11,931,305 B2
(45) Date of Patent: Mar. 19, 2024

(54) EMERGENCY LIFTING APPARATUS

(71) Applicant: Kevin Comstock, Beaverton, OR (US)

(72) Inventor: Kevin Comstock, Beaverton, OR (US)

( * ) Notice: Subject to any disclaimer, the term of this patent is extended or adjusted under 35 U.S.C. 154(b) by 253 days.

(21) Appl. No.: 17/701,310

(22) Filed: Mar. 22, 2022

(65) Prior Publication Data

US 2022/0304878 A1 Sep. 29, 2022

Related U.S. Application Data

(60) Provisional application No. 63/164,880, filed on Mar. 23, 2021.

(51) Int. Cl.
*A61G 7/10* (2006.01)

(52) U.S. Cl.
CPC ......... *A61G 7/1059* (2013.01); *A61G 7/1013* (2013.01); *A61G 7/1046* (2013.01)

(58) Field of Classification Search
CPC ... A61G 7/1059; A61G 7/1013; A61G 7/1046
See application file for complete search history.

(56) References Cited

U.S. PATENT DOCUMENTS 3,877,421 A * 4/1975 Brown ................. A61G 7/1046 5/81.1 R
4,010,499 A * 3/1977 Davis ....................... A61G 7/10 280/47.38
4,070,721 A * 1/1978 Stasko ................. A61G 7/1051 5/89.1
11,458,055 B2 * 10/2022 Tiu ........................ A61G 7/1046
2022/0151850 A1 * 5/2022 Tiu ........................ A61G 7/1017
2023/0125855 A1 * 4/2023 Tsukamoto .......... A61G 7/1092 5/86.1
2023/0127337 A1 * 4/2023 Tsukamoto .......... A61G 7/1019 5/86.1
2023/0129851 A1 * 4/2023 Nemoto ............... A61G 7/1086 5/86.1
2023/0320921 A1 * 10/2023 Dilorenzo ................ A61H 3/04 135/66

* cited by examiner

*Primary Examiner* — Erez Gurari
(74) *Attorney, Agent, or Firm* — Mark S Hubert

(57) ABSTRACT

A portable, lightweight emergency lifting device for downed persons that is intended for use by paramedics/emergency personnel as well as medical facilities and private owners. The lifting device has a redundant, fail safe lifting system utilizing twin electric screw jacks. It has a seat with a ramped front edge that extends to the ground when the device is in its collapsed configuration to aid in loading the patient. The vertical legs open only to an acute angled position so as to leave the immediate area under the seat open and uncluttered. The frame is on casters and the seat resides between the horizontal frame members when the device is in its collapsed configuration thus allowing the lowest possible pick up of a patient.

15 Claims, 6 Drawing Sheets

EMERGENCY LIFTING APPARATUS

CROSS-REFERENCE TO RELATED APPLICATIONS

This application claims the benefit of U.S. provisional patent application No. 63/164,880, filed Mar. 23, 2021, which is incorporated by reference herein in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to devices for use by emergency services personnel, or and more particularly to mechanized, low clearance lifts for injured people on the ground.

BACKGROUND

Medical conditions, age and accidents commonly cause the afflicted to fall to the ground. Once there, often they cannot rise on their own nor can they be righted by others without proper training for fear of compounding further any injuries they may have sustained. In other instances, because of pre-existing conditions, they must be raised very delicately. Lastly, in other situations because of obesity they can't be raised manually.

When raising a downed person, extreme care must be taken to ensure there is no second collapse, weight is shifted safely and the aiding person does not injure themselves. If not handled properly, a simple lift can have disastrous results for the downed person, the aiding party or possibly both.

There are existing mechanized lifts that are utilized by emergency services but these are bulky, heavy, expensive and need specialized training to operate properly and safely. What is needed is an inexpensive, lightweight, compact personal lift that has built in safety guards, is simple to operate and that has a lift approach height directly on, or as close to the ground as possible.

Henceforth, an emergency human lift apparatus that approaches the downed person as low to the ground as possible and slowly and safely raises them from the ground to a seated position in accordance to patient's height, would fulfill a long felt need in nursing homes, private residences, hospitals and emergency service vehicles. This new invention utilizes and combines known and new technologies in a unique and novel configuration to overcome the aforementioned problems and accomplish this.

BRIEF SUMMARY

In accordance with various embodiments, an emergency personal lifting apparatus that pulls the downed person up and back simultaneously, eliminates pinch points, has fail-safe redundant lifting capabilities, has lifting rams with a locked extended position on power failure, and is compact and light enough to be carried by one person, is provided.

In one aspect, an emergency human lifting apparatus having zero or a minimal ground clearance height from which the person can be loaded, is provided.

In another aspect, an emergency human lifting apparatus with its lifting chair positioned between its frames two horizontal frame members.

In yet another aspect, a battery powered electric emergency human lifting apparatus with a safety securement strap to constrain the injured In yet another aspect, lightweight, a roll-able emergency human lifting apparatus able to vertically raise its chair from less than 2 inches off of the ground to more than 2 feet, and having an overall length approaching three feet.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

Figure 1:
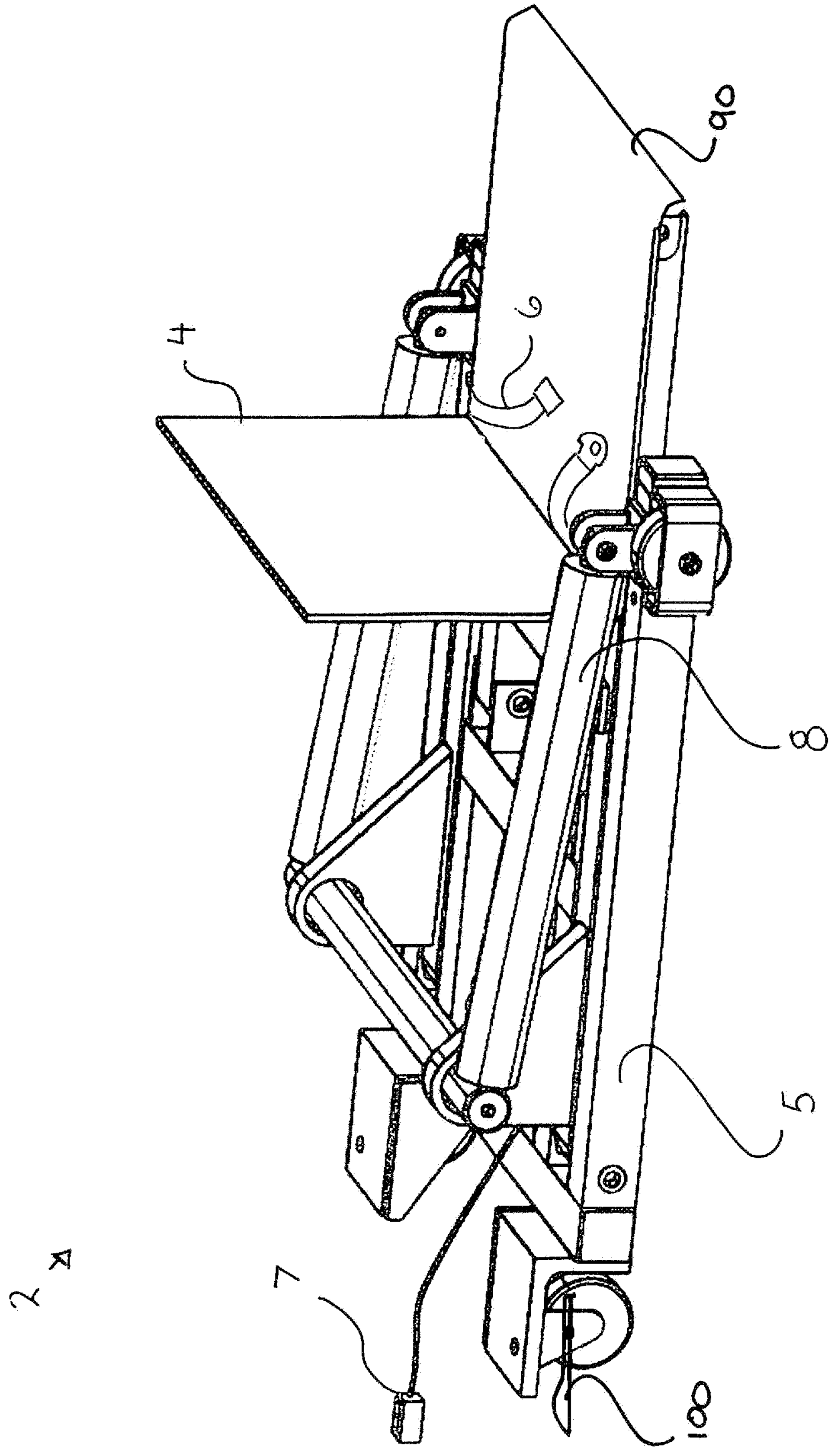
FIG. 1 is a front perspective view of the emergency lift apparatus in its collapsed configuration with the patient restraint removed.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. The described example is provided for illustrative purposes and is not intended to limit the scope of the invention.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items.

As used herein, the terms "inboard" and "outboard" refer to the location of various components with respect to the U shaped chassis. Inboard refers to elements positioned between the two support rails while outboard refers to elements positioned on the outer sides of the support rails and not within the U shaped configuration of the chassis.

The present invention relates to a novel design for a lightweight, aluminum, compact, collapsible, battery powered, emergency lifting apparatus ("floor lift") with redundant, fail-safe lifting mechanisms for raising downed humans off of the ground, having a polymer vertical lift chair capable of extending to the ground or within one inch of the ground by virtue of its strategic placement within its rolling frame. For descriptive references herein, the front or proximal end and direction is at the end of the floor lift that the chair faces, and the rear or distal end and direction is the end of the apparatus from which the rams of the linear actuator extends.

The floor lift 2 (FIG. 1) is an emergency necessitated aluminum apparatus that is lightweight and compact, and measuring between three and four feet long, two feet wide and two feet high when vertically erect (FIG. 2), that has a seat pickup height optimally at ground level but in alternative embodiments without the polymer seat ramp, no more than one inch from the ground. When in its collapsed configuration with a lift plate 38 (FIG. 4), it is less than one inch from the ground. This novel design allows a polymer bucket style seat 4 with a safety belt 6, to be slid under a person on the ground and safely raised to a height of approximately two feet by a remote control switch 7 (directly wired or wireless) by a redundant, fail-safe pair of parallel battery powered electric linear actuators 8 selected from the set of linear actuators comprising screw jacks, direct motor drive actuators, belt drive actuators, hydraulic jacks and pneumatic jacks. Optionally, in other alternate embodiments, it may utilize a manually operated hydraulic ram as its lifting force. The preferred embodiment of the chassis 2 is fabricated from a lightweight but strong material such as aluminum or carbon fiber.

Figure 2:
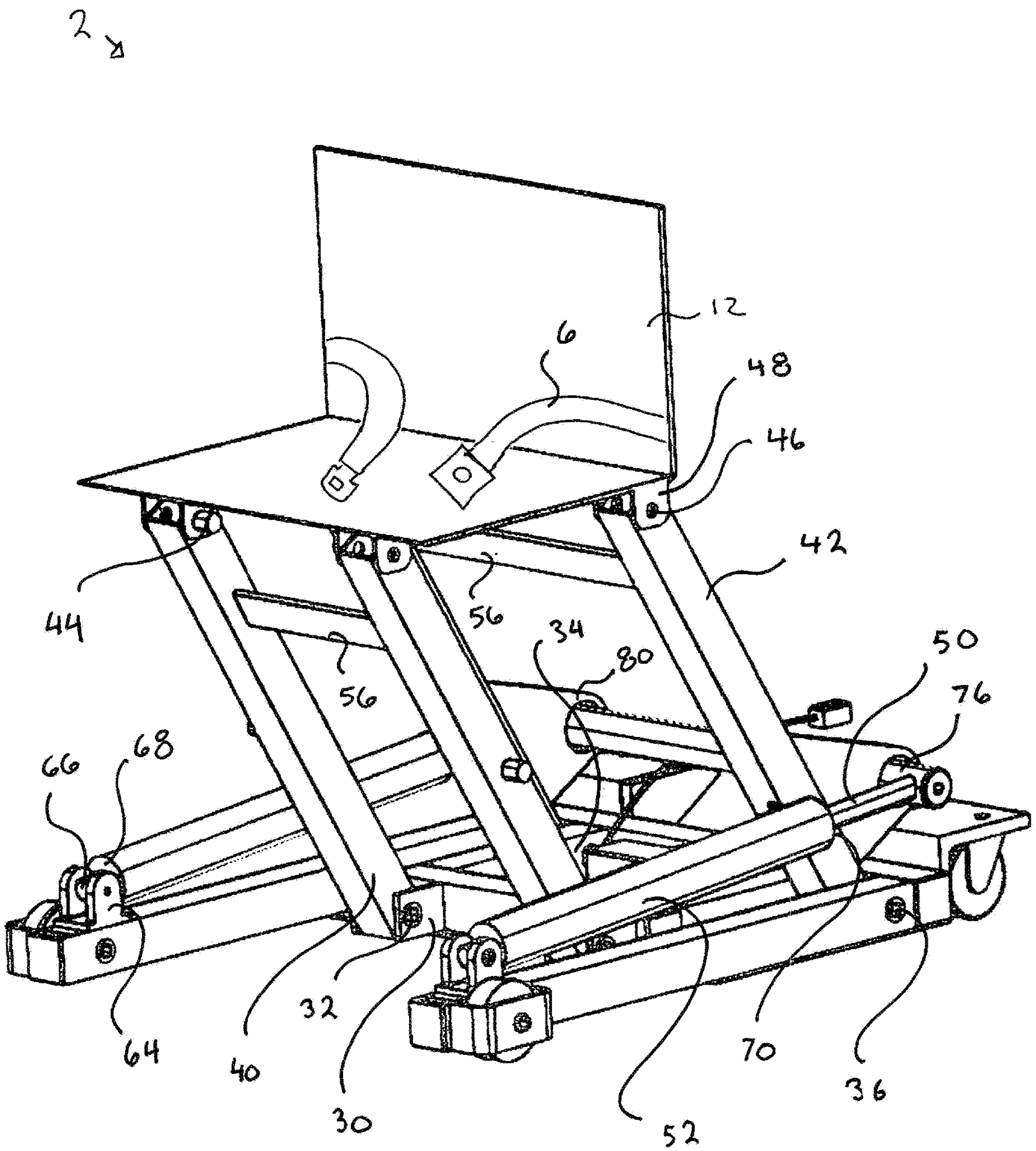
FIG. 2 is a front perspective view of the emergency human lift apparatus in its extended configuration (linear actuator rams both extended) with the front seat ramp removed for visual clarity.
Figure 3:
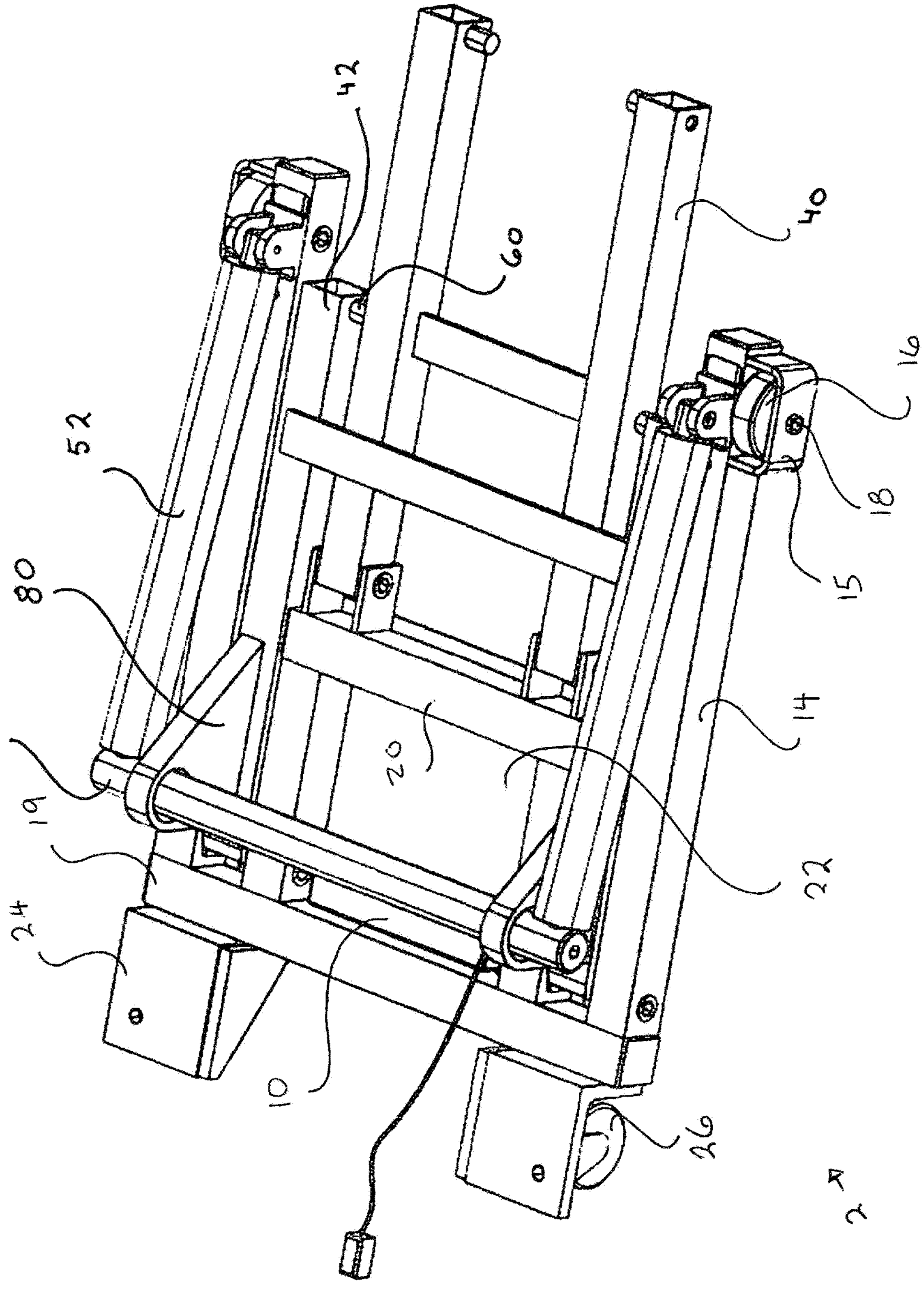
FIG. 3 is a top perspective view of the emergency lift apparatus with the seat removed for visual clarity.
Figure 4:
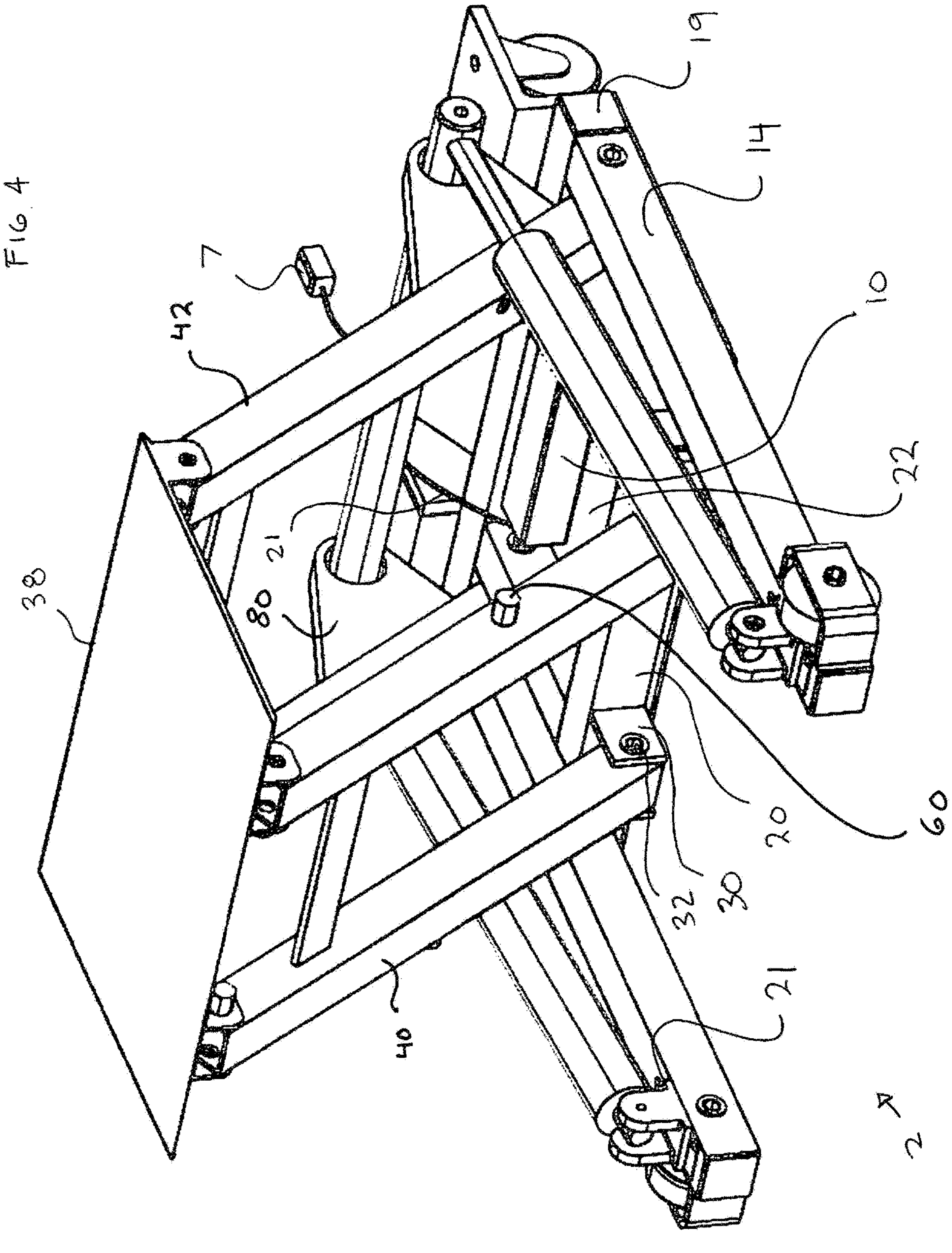
FIG. 4 is a side perspective view of the emergency lift apparatus with a platform, in a collapsed configuration (liner actuator ram retracted)

Looking at FIG. 1-4, it can be seen that the bare floor lift chassis 5 (the floor lift without the two linear actuators 8, battery 10, operational switch 7 and bucket seat 4 with safety belt 6, is a U shaped chassis, consisting of a pair of linear rolling support rails 14 held in a horizontal, parallel configuration by a perpendicular rear rail 19 and at least one perpendicular cross member 20. The rear rail 19 and the cross member 20 are also parallel. The cross member 20 is directly connected to the inboard sides of the support rails 14 between the distal and proximal ends of the support rails 14 to help maintain the parallelism and rigidity of the chassis 5. The rear rail 19 extends between the edges of the outboard sides of the support rails 14. Between the rear rail 19 and the cross member 20, is a platform 22 with a battery 10 secured thereon. In FIG. 4, the hard wire 21 can be seen going from the battery 10 through the remote switch 7 and then to the motors of the electric liner actuators 8. The chassis 5 is made of rectangular or square aluminum tubing, selected for strength and weight.

Figure 5:
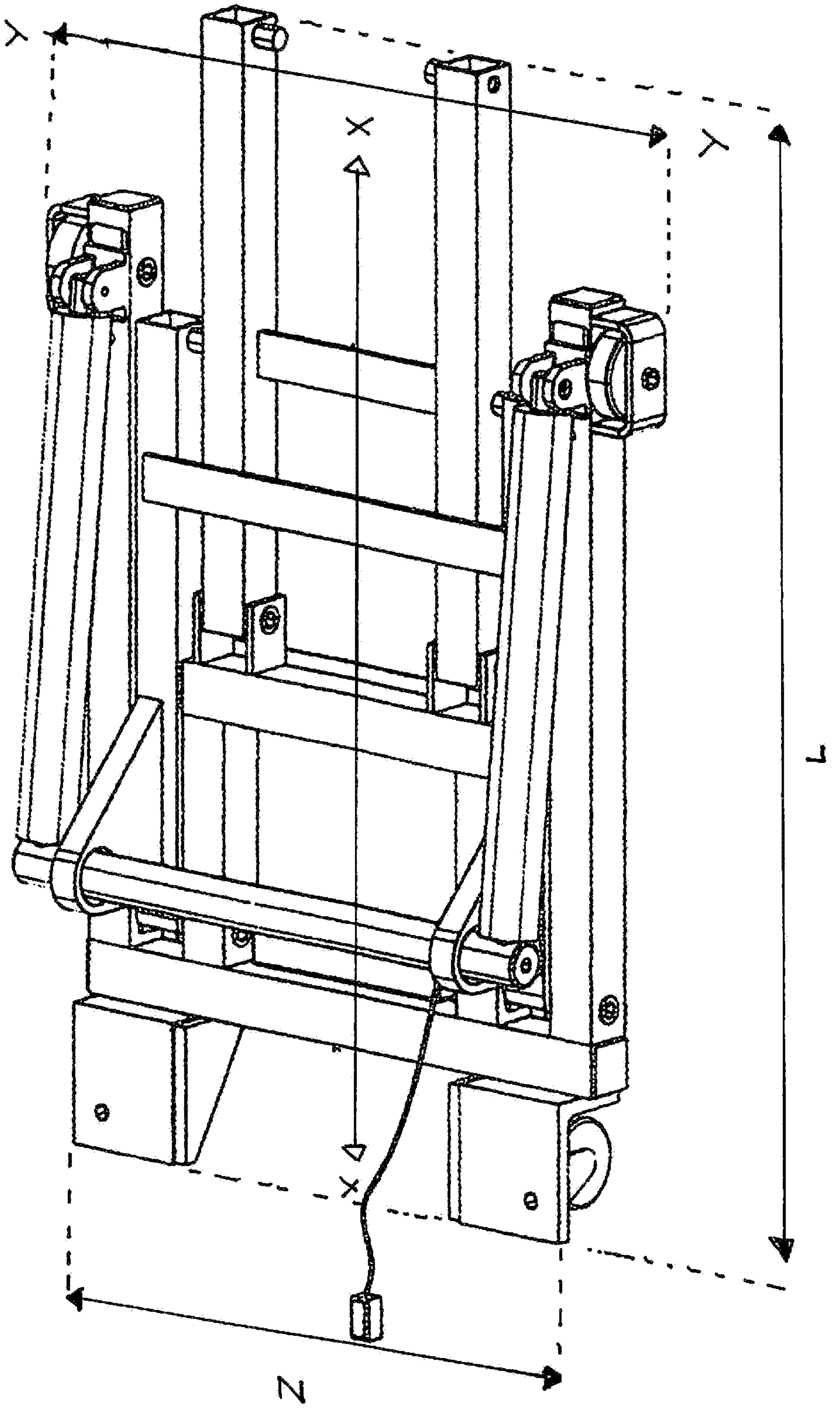
FIG. 5 is a top perspective view of the emergency lift apparatus showing the apparatus's centerline and wheel distances.

Along the rear face of the rear rail 19 an L shaped bracket 24 is affixed that supports a pivot able caster wheel 26. This wheel is larger in diameter than the thickness of the tubing the rear rail 19 is made of so that it sits above the top face of the rear rail 19. Each linear support rail 14 has a fixed, front side wheel 16 rotationally supported on an axle 18 extending between the outboard side of the proximal end of the support rail 14 and a front wheel bracket 15. The caster wheels have a distance between them Z (FIG. 5) and are offset inward and are closer to the longitudinal centerline X (FIG. 5) of the chassis 5 than the fixed, non-pivotable front wheels 38. The distance between the front wheels Y (FIG. 5) is thus greater than the distance between the caster wheels Z (FIG. 5). This steering design with the rear wheels offset inward, having a distance between them of Z (FIG. 5) from the front wheels has been found to be the most effective steering design for use in narrow areas such as hallways. The distance between the front wheels Y (FIG. 5) is the effective, maximum width of the lift chair 2. Since this offset wheel design has the front wheels on the outside of the support rails, and the rear wheels behind the support rails, steering can be affected from the distal end of the lift chair 2 even with zero clearance between walls and the front wheels. This is important in situations where the lift chair's front wheels contact or are in close proximity to the baseboards of the space.

Extending forward from the front/proximal face of the cross member 20 are two pairs of front axle flanges 30, each with a front axle 32 extending therebetween that resides parallel to the cross member 20. These front axles 32 each go through orifices in the bottom end of the front seat stanchions 40 to allow their pivotal motion as the seat 12 is raised or lowered. Extending forward and perpendicularly from the rear rail 19 are two rear axle flanges 34. Extending inboard and perpendicularly through the support rails 14 at their distal ends to the rear axle flanges 34, are two rear axles 36. These rear axles 36 each go through orifices in the bottom end of the rear seat stanchions 42, also to allow their pivotal motion as the seat 12 is raised or lowered.

There are two front seat stanchions 40 and two rear seat stanchions 42 that have bottom orifices in their bottom ends to accommodate the front and rear axles 32 and 36. There are top orifices at the top end of each of these four stanchions 40 and 42, that similarly accommodate top front axles 44 and top rear axles 46. Extending downward from the bottom face of the seat 12 are four pair of seat mounting flanges 48. The top front and rear axles 44 and 46 are engaged between their respective seat mounting flanges 48 and the top ends of front and rear seat stanchions 40 and 42. This enables the rotational motion of the seat stanchions at their top and bottom ends as the seat 12 is raised or lowered. All of the axles will be mechanically mounted in any of a conventional method known in the art, although circlips retained in circular grooves cut around both ends of each axle is the most common. There may also be friction reducing members such as plain bearings or flat washers of a low friction material, placed between the contacting surfaces. FIG. 4 shows a lift plate 38 that substitutes for the seat 12. The lift plate 38 has all the same connection elements as the bottom face of the seat 12. It is to be noted that the seat 12 and lift plate 38 may be interchanged or may function together where an alternate embodiment seat is mechanically mounted to the lift plate 38.

The two pair of seat stanchions 40 and 42 are of approximate equal length, reside with their linear axes parallel to each other, and are raised or lowered simultaneously by the rams 50 of the linear actuators 52. There are optional bracing members 56 between the pair of front stanchions 40, and optional bracing members between the pair of rear stanchions 42 to minimize any lateral motion of the seat 12 and to generally stiffen the entire lift chair 2.

The two pair of seat stanchions 40 and 42, while having parallel linear axes, do not have a footprint that is rectangular in configuration. This is because the bottom end of the front stanchions 40 are rotationally connected to the cross member 20 while the rear stanchions 42 are rotationally connected to the inside faces of the support rails 14. As can best be seen in FIG. 3, the distance between the rear seat stanchions 42 is greater than the distance between the front seat stanchions 40. Thus, the two pair of seat stanchions 40 and 42 are offset from each other and their footprint forms an isosceles trapezoid. This stanchion configuration allows the width of the lift chair 2 to be minimized as well as keeping the pivot point of the front stanchions 40 slightly back from the edge of the seat 12. This prevents any pinch points as people often grab the front edges and sides of the seat 12 while it is in motion. The fingers of a patient grasping the seat are sufficiently distant from the pivot points.

As illustrated in FIG. 3, when the lift chair 2 is in its collapsed configuration, the rear stanchions 42 reside adjacent the front stanchions 40. All four stanchions will reside within the U shaped configuration of the chassis 5 when the lift chair is lowered to its lowest position. Depending on the spacing between the stanchions 40 and 42, there may be spacers 60 utilized that extend normally from the sides of the front or rear stanchions 40 and 42. This configuration of the footprint of the four stanchions allows the overall width of the lift chair 2 to be minimized as it is intended primarily for use by emergency personnel. As such, it must be as small as possible for transport and storage.

Looking again at FIG. 2 it can be seen that there are two linear actuators 52 pivotally mounted on the top faces of the support rails 14 at their proximal ends. There is a pair of front actuator flanges 64 and axles 66 extending from the support rails 14 that pivotally couple the front, fixed ends 68 of the linear actuators 52. The linear actuators 52 have their linear axes in the same plane as the linear axes of the support rails 14 regardless of the acute angle the linear actuators 52 form with the support rails 14 as the seat 12 is raised and lowered.

The extendable ends 70 of the linear actuator 52 have rams 50 that extend rearward along the linear axes of the linear actuator 52. The distal ends of the rams 50 are affixed to the left and right ends of a bearing rod 76 that passes through orifices through lift plates 80 that extend from the back face of the rear stanchions 42. The lift plates 80 are free to pivot about the bearing rod 76 as the ram 50 is extended. In the preferred embodiment the linear actuator is an electric screw jack operably connected to the battery 10 and powered for ram extension or retraction through a remote, operational switch 7.

When the ram 50 is extended, the bearing rod 76 exerts a force simultaneously onto the lift plates 80 which pull the rear stanchions 42 rearward and at a vertical angle. (FIG. 4) This causes both the stanchions 40 and 42, the seat 12 and the distal ends of the linear actuators 52 to rise vertically. Via the physical connectivity through the seat 12, the front stanchions 40 are pulled rearwards from their top end at the same acute angle with respect to the support rails 14. The seat 12 is slowly and smoothly vertically raised approximately two feet (within a normal seating height range.) The stanchions always move such that there is an acute angle formed between them and the support rails 14 or the ground and the stanchions never reach a position perpendicular to the ground or support rails 14. In this way there is never the possibility of the lift chair 2 flipping over toward the rear/distal direction when a heavy patient shifts their weight. Also, this keeps the bottom end of the stanchions 40 and 42 way from the legs and clothing of the patient.

FIG. 1 shows the preferred embodiment seat 12. It is made of a molded polymer and has an angled or contoured front lip 90 that extend below the planar seating surface and is intended to contact the floor or ground when the linear actuators 52 are in their fully retracted positions and the seat 12 is at its lowest configuration. The angled front lip 90 simplifies sliding a patient onto the seat without fear of catching body parts or clothing between the lift chair 2 and the ground, making the transition easy and safe. In this way the apparatus may be positioned adjacent the downed human and the seat 10 rolled under them with the support rails 14 on either side of their body. They may then be righted and strapped onto the seat 12 and the apparatus 2 energized to raise them to a vertical position where they can be lifted safely or lid into a wheelchair or bed.

FIG. 2 shows the front lip 90 of the seat 12 removed so the pivot and connection points at the top of the stanchions can be seen. The switch 7 that enables the linear actuators 52 to extend or retract their rams 50 is designed for remote rather than local use only. This is a safety feature. Not mounting the switch 7 directly onto the lift chair 2 itself. In this way there can be no inadvertent actuation of the lift chair 2 by the assisting personnel/patient while getting the patient into position or by the patient while they a raised and seated.

In operation, the lift chair 2 is transported in its collapsed configuration and placed on the floor/ground directly behind the downed person. The lift chair 2 is then rolled up to the person until the front lip 90 contacts or is in extremely close proximity to their downed body. The locks 100 on the rear wheels (if so equipped) are engaged to prevent any movement away from the downed person as they apply their weight onto the lift chair 2 in their attempt to get onto the seat 12. Once on and seated properly in a centered, upright position, the assisting personal uses the remote switch 7 to slowly raise the seat 12. When the seat reaches its highest position (with the rams 50 fully extended), and with the stanchions 40 and 42 still at an acute angle with respect to the ground, the remote switch has a fail-safe feature that will sense the increase in current and its overload sensor will stop the power from the battery 10 to the electric linear actuators 52. The linear actuators have a built in locking mechanism that is designed with a “fail off” position such that upon loss of electric power all motion of the ram 50 will be prevented and the seat 12 cannot lower even under load. Using two linear actuators 52 doubles the lifting capability and their redundancy increases their reliability and safety factor. It is to be noted that the stanchions 40 and 42 never attain a truly vertical position that is 90 degrees from the support rails. This is a safety feature to prevent backward tipping, allow a forward collapse in the event of both linear actuators failing coincident with a power loss, and to allow maximum clearance under the front of the seat.

Figure 7:
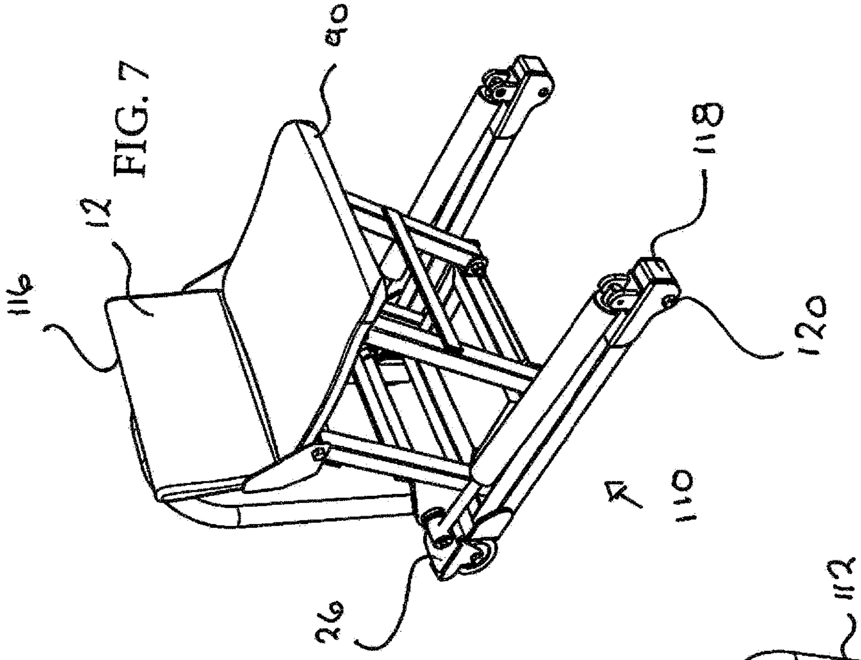
FIG. 7 is a front perspective view of an alternate embodiment of the emergency lift apparatus in an extended configuration.
Figure 6:
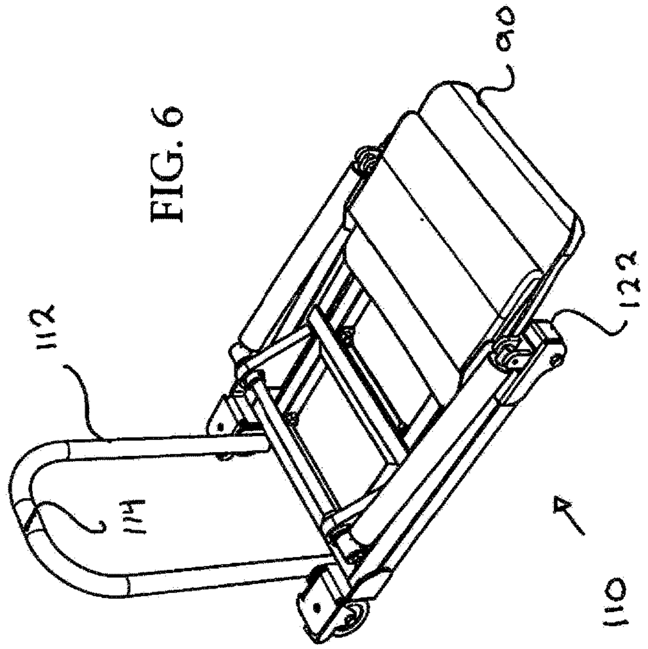
FIG. 6 is a front perspective view of an alternate embodiment of the emergency lift apparatus in a collapsed configuration.
Figure 8:
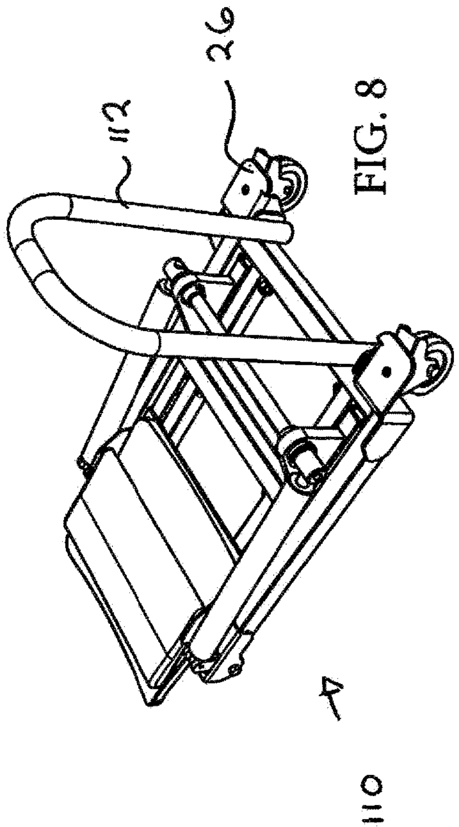
FIG. 8 is a rear perspective view of an alternate embodiment of the emergency lift apparatus in a collapsed configuration.

Looking at FIGS. 6 to 8, the alternate embodiment emergency lift apparatus 110 can best be seen and the differences between it and the primary embodiment 2, best explained. In the alternate embodiment 110 there is a push handle 112 removably attached at the rear of the lift 110, preferably onto the rear rail 19. In it extended configuration (FIG. 7) the top 114 of the push handle 112 is lower than the top 116 of the back of the seat 12. With the push handle 112 located adjacent the pivot able caster wheels 26, steering from the push handle 112 requires minimal effort. In this alternate embodiment there is a front wheel assembly that has a support sleeve 118 that fits atop the proximal (front) end of the support rails 14, and has a front axle 120 that the front wheels are rotationally mounted on. These front wheels and rear caster wheels 26 lie along linear axes that are parallel to the linear axes of the two support rails 14. The support sleeve 118 of the front wheel assembly has a front cap 122 to prevent any object (i.e. carpet, slipper, clothing) from contacting the wheel and being able to wrap around the wheel and jam it or to prevent the device from rolling over a person's toes.

As discussed above, one can realize that this lift chair 2 has a plethora of novel features that increase the safety and usability of it. The design of the lift chair 2 with the offset pair of stanchions 40 and 42 having a footprint that forms an isosceles trapezoid allows the lift chair 2 to have a small width Y (approximately 24 inches). The use of aluminum rectangular tubing for the chassis and stanchions allows the weight to be less than 30 pounds. The use of two linear actuators allows redundancy for reliability, safety and increased lift capacity greater than 600 pounds. The use of fail safe electric actuators allows the seat to remain in its vertical position in the event of a power loss to the lift chair. The ramped design of the front lip of the seat allows the seat to reach the ground so that downed people to be slid onto the seat without appendages and clothing from being caught. The lip design of the seat in combination with the narrower offset of the front stanchions also eliminates pinch points from people grasping the seat. The design where the maximum extent of the rams of the linear actuators can only erect the stanchions to an acute forward angle with respect to the support rails prevents the lift chair from ever tipping over backwards and allows the maximum amount of clearance between the front stanchions and the person's legs and clothing. The offset design of the front and back wheels allow for rear steering in close quarters. The U shaped configuration of the chassis allows for an open front side such that the stanchions may nestle aside and adjacent each other as low to the floor as possible, thereby minimizing the thickness or height of the floor lift. Lastly, the feeling of being pulled slowly, evenly upward and backward is a very comforting feeling of stability.

While certain features and aspects have been described with respect to exemplary embodiments, one skilled in the art will recognize that numerous modifications are possible. In the preferred embodiment, the lift chair 2 is between three and four feet long L (FIG. 5), two feet wide Y (FIG. 5) and can rise to a vertical height of approximately two feet.

Having thus described the invention, what is claimed as new and desired to be secured by Letters Patent is as follows:

1. An emergency lifting apparatus to raise a person from the ground to a seated height, comprising:
- U shaped rolling chassis made of a pair of parallel support rails having a proximal end and a distal end, wherein a rear rail is connected between said distal ends so as to reside perpendicular to said support rails;
- a seat having a back and a ramped front lip;
- a seatbelt affixed to said lifting apparatus for connection across said seat;
- a pair of front stanchions pivotally connected between said seat and said chassis;
- a pair of rear stanchions pivotally connected between said seat and said chassis, each rear stanchion having a rear axle flange extending perpendicularly from a back face of said rear stanchions, said axle flanges having an axle orifice therethrough;
- a pair of linear actuators having a front end and a rear end, each one of said pair of linear actuators pivotally connected to a proximal end of top face of one said support rails and each one of said pair of linear actuators having a rear extendible ram connected to an opposing end of an axle that passes through said orifices in said both rear axle flanges; and
- a battery, operably connected to said pair of linear actuators through a remote switch.

2. The emergency lifting apparatus of claim 1 further comprising:
- cross member affixed perpendicularly between said support rails and located between said proximal and said distal end of said support rails.

3. The emergency lifting apparatus of claim 1 further comprising:
- a pair of fixed front wheels each rotatably connected to an outside face of one of said support rails at said support rail's proximal end;
- a pair of pivotable rear wheels mounted on a bracket extending from a rear face of said rear rail; and
- wherein a distance between said front wheels exceeds a distance between said rear wheels.

4. The emergency lifting apparatus of claim 1 further comprising a collapsed configuration and an extended configuration, wherein when in said collapsed configuration, said front ramped lip of said seat contacts said ground.

5. The emergency lifting apparatus of claim 1 wherein said each linear actuator has a linear axis that is parallel with a linear axis of said both said support rails.

6. The emergency lifting apparatus of claim 1 wherein said pair of front stanchions and said pair of rear stanchions have a isosceles trapezoid footprint.

7. The emergency lifting apparatus of claim 1 wherein said seat resides between said support rails.

8. The emergency lifting apparatus of claim 4 wherein when in said extended configuration, said front stanchion and said rear stanchions reside at an acute angle to said support rails.

9. The emergency lifting apparatus of claim 8 wherein a bottom end of each of said front stanchions is connected to said cross member, and a bottom end of each of said rear stanchions is connected to a different one of said support rails.

10. An emergency lifting apparatus to raise a person from the ground to a seated height, comprising:

U shaped rolling chassis;

a seat;

a pair of front stanchions pivotally connected between said seat and said chassis;

a pair of rear stanchions pivotally connected between said seat and said chassis, a pair of linear actuators each having a front end pivotally connected to said chassis and each having a rear end with an extendible ram attached to said pair of rear stanchions; and a battery, operably connected to said pair of linear actuators through a remote switch;

wherein said extendible ram is adapted to pull said seat vertically backward to a fully raised position where such front stanchions and said rear stanchions form an acute angle with said chassis.

11. The emergency lifting apparatus of claim 10 wherein said front stanchions and said rear stanchions have bottom ends that form a footprint of an isosceles trapezoid.

12. The emergency lifting apparatus of claim 11 wherein said seat resides within said chassis and has a ramped front lip.

13. The emergency lifting apparatus of claim 12 further comprising:

a pair of front wheels fixed onto a side of said chassis and having a first distance therebetween; and a pair of rear wheels affixed to a back of said chassis and having a second distance therebetween, wherein said first distance is greater than said second distance.

14. The emergency lifting apparatus of claim 1 further comprising:

a pair of fixed front wheels, one of said front wheels a right front wheel and one of said front wheels a left front wheel, each rotatably connected to a proximal end of one of said support rails;

a pair of pivotable rear wheels, one of said rear wheels a right rear wheel and one of said rear wheels a left rear wheel, each pivotally and rotationally mounted on a bracket extending from a rear face of said rear rail; and wherein a linear axis between said left front wheel and said left rear wheel, and a linear axis between said right front wheel and said right rear wheel are parallel to each other and parallel to a linear axis of said support rails.

15. The emergency lifting apparatus of claim 14 further comprising a push handle extending vertically from said distal end thereof.

* * * * *